(12) United States Patent
Heidrich (10) Patent No.: US 10,361,612 B2
(45) Date of Patent: Jul. 23, 2019

(54) SHORT-CIRCUITING RING AND ROTOR FOR AN ELECTRIC MACHINE

(71) Applicant: Robert Bosch GmbH, Stuttgart (DE)

(72) Inventor: Markus Heidrich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/327,428

(22) PCT Filed: Jun. 1, 2015

(86) PCT No.: PCT/EP2015/062093
§ 371 (c)(1),
(2) Date: Jan. 19, 2017

(87) PCT Pub. No.: WO2016/012135
PCT Pub. Date: Jan. 28, 2016

(65) Prior Publication Data
US 2017/0155310 A1    Jun. 1, 2017

(30) Foreign Application Priority Data
Jul. 21, 2014   (DE) ................. 10 2014 214 133

(51) Int. Cl.
*H02K 3/28*  (2006.01)
*H02K 15/00*  (2006.01)
*H02K 17/16*  (2006.01)

(52) U.S. Cl.
CPC ............ *H02K 17/165* (2013.01); *H02K 3/28* (2013.01); *H02K 15/0012* (2013.01)

(58) Field of Classification Search
CPC ...... H02K 3/28; H02K 15/0012; H02K 17/16; H02K 17/165; H02K 17/18; H02K 17/185

USPC .................................................. 310/211, 212
See application file for complete search history.

(56) References Cited

U.S. PATENT DOCUMENTS

| | | | | |
|---|---|---|---|---|
| 1,112,452 | A * | 10/1914 | Hoock ................. | H02K 17/165 310/211 |
| 1,678,912 | A * | 7/1928 | McLeod ............... | H02K 17/165 310/212 |
| 5,144,175 | A * | 9/1992 | Craggs ................. | H02K 1/32 310/61 |
| 2007/0284953 | A1 | 12/2007 | Lyons et al. | |
| 2008/0136269 | A1 * | 6/2008 | Kaihatsu .............. | H02K 7/04 310/402 |

(Continued)

FOREIGN PATENT DOCUMENTS

| CH | 398767 | 3/1966 |
|---|---|---|
| CN | 103795195 A | 5/2014 |

(Continued)

OTHER PUBLICATIONS

Rosenburg et al., Machine Translation OC CH398767, Mar. 1966.*

(Continued)

*Primary Examiner* — Quyen P Leung
*Assistant Examiner* — Eric Johnson
(74) *Attorney, Agent, or Firm* — Michael Best & Friedrich LLP (57) ABSTRACT

The invention relates to a short-circuiting ring for an electric machine, comprising a single-piece serpentine ring member (7) made of a single-piece strip material. The invention also relates to a rotor for an electric machine.

20 Claims, 9 Drawing Sheets

(56) References Cited

U.S. PATENT DOCUMENTS

2013/0069476 A1   3/2013   Lyons et al.

FOREIGN PATENT DOCUMENTS

DE   1765061   4/1958
DE   1275675   8/1968

OTHER PUBLICATIONS

International Search Report for Application No. PCT/EP2015/062093 dated Nov. 6, 2015 (English Translation, 2 pages).

* cited by examiner

SHORT-CIRCUITING RING AND ROTOR FOR AN ELECTRIC MACHINE

BACKGROUND OF THE INVENTION

The present invention relates to a short-circuiting ring for a rotor and to a rotor for an electric machine.

In electrically driven vehicles, for example asynchronous machines are used. They have a rotor which is embodied as a short-circuit rotor. In this context, a laminated rotor core, which is connected by means of rods, is generally used. In this context, a short-circuiting rings are provided on the end surfaces which are embodied as what is referred to as a cage. There are two possible ways of manufacturing the short-circuiting rings here. On the one hand, the short-circuiting ring can be manufactured by casting. Alternatively, rods and short-circuiting rings can be plugged onto the rotor core and subsequently connected electrically by means of soldering or welding or the like. In this context, the receptacles for the rods are manufactured by means of metal-cutting methods, for example milling from the entire structure. These manufacturing variants of the short-circuiting rings are very costly and expensive in this context and are, in particular, subject to only small tolerances, with the result that high costs are incurred during manufacture. Examples of the manufacture of short-circuiting rings are described in U.S. 2013/0069476 A1 or U.S. 2007/0284953 A1.

SUMMARY OF THE INVENTION

The inventive short-circuiting ring for an electric machine has the advantage that the short-circuiting ring can be manufactured from a single-piece strip material, e.g. a piece of sheet metal. As a result, the inventive short-circuiting ring can be fabricated and mounted very easily and cost-effectively. In particular, costly subsequent work such as in the case of cast short-circuiting rings are not necessary. The short-circuiting ring according to the invention can be manufactured quickly and in large numbers by means of a bending method. The inventive short-circuiting ring has a single-piece, serpentine annular body composed of the strip material, wherein the strip material is in a rectangular shape in its initial form, with the result that practically no wastage is produced during fabrication. The right-angled strip material is then reshaped into the desired serpentine form of the annular body with a multiplicity of meanders (loops). The single-piece annular body is preferably formed in a serpentine fashion here in the circumferential direction. The present invention therefore discloses a completely new way of manufacturing a short-circuiting ring from a single-piece strip material, which short-circuiting ring can be manufactured easily and cost-effectively by shaping the strip material.

The annular body preferably has a multiplicity of double-wall regions with a first and a second wall. The shaping of the strip material takes place here in such a way that double-wall regions are present on the serpentine annular body. As a result, in particular, larger tolerances can be selected, with the result that the manufacture of the serpentine annular body can be made less expensive.

The serpentine annular body preferably comprises a multiplicity of meanders which are directed in the radial direction of the annular body. As a result, the serpentine annular body can particularly easily be manufactured from the strip material. The meanders are preferably arranged alternately on the inner circumference and outer circumference of the annular body.

The double-wall regions of the annular body also preferably run in the radial direction of the annular body. In this context, preferably all the regions of the annular body which are directed in the radial direction are embodied as double-wall regions. As a result, a serpentine annular body can be made with particularly large tolerance compensation.

The first and second walls of the double-wall regions are particularly preferably connected to one another in a radially outwardly directed direction of the annular body by means of an arcuate outer connection region which forms meanders. As a result, a very compact short-circuiting ring can be made available.

Between the first and second walls of the double-wall region there is preferably a gap which is open in the radially inwardly directed direction of the annular body. This gap is preferably subsequently filled with a solder or other conductive material after mounting on a rotor end side.

In addition, the short-circuiting ring preferably also comprises arcuate internal connecting regions which connect adjacent double-wall regions to one another. The internal connecting regions preferably have a small radius which is adapted to the radius of short-circuiting rods.

According to an alternative preferred refinement of the invention, the serpentine annular body comprises a multiplicity of meanders which are directed in the axial direction of the annular body. In this context, arcuate connecting regions are arranged rotated through 90° compared to the serpentine annular body, with meanders running in the radial direction. Furthermore, double-wall regions of the annular body run in the axial direction here.

The short-circuiting ring also preferably comprises at least one air circulation vane, preferably a multiplicity of air circulation vanes which protrude from the annular body. The air-circulation vanes preferably protrude in the axial direction of the annular body here and improve cooling of the short-circuiting ring.

The air-circulation vanes are preferably arranged on at least one of the walls of the double-wall regions. As a result, the air-circulation vanes can be provided on the strip material e.g. already during the stamping process of the strip material. During the shaping process of the strip material to form the serpentine annular body, the air-circulation vanes are then arranged automatically on the short-circuiting ring at the corresponding, previously selected position.

For particularly simple mounting, in particular on an end side of the short-circuiting ring, the annular body has a chamfer on edge regions. The chamfer can also be punched in the fabrication process (bending).

The serpentine annular body is also preferably formed in such a way that receptacle sections for receiving rod ends of short-circuiting rods of a rotor are present between adjacent double-wall regions. The receptacle sections are particularly preferably embodied in a tapering fashion here, in particular in a conically tapering fashion, between the double-wall regions.

Furthermore, the present invention relates to a rotor for an electric machine, comprising a short-circuiting ring according to the invention.

The rotor according to the invention also preferably comprises short-circuiting rods which protrude into receptacle sections of the short-circuiting ring. The short-circuiting rods are particularly preferably embodied here in such a way that at least one of the short-circuiting rods protrudes beyond the short-circuiting ring, in order to bring about air circulation during operation. As a result, a short-circuiting rod, or a plurality of short-circuiting rods, carry out the air circulation and therefore implement improved cooling of the rotor.

The short-circuiting rods of the rotor also preferably have a tapering cross section. The short-circuiting rods particularly preferably have a droplet shape in cross section.

According to a further preferred refinement of the present invention, a positively locking connection or a frictionally locking connection is provided between the short-circuiting rods of the rotor and the short-circuiting ring. Alternatively, a soldered connection or a welded connection is provided between the short-circuiting rods and the short-circuiting ring. Solder material or weld material is preferably provided here on the short-circuiting ring in the case of double-wall regions in such a way that said material can pass into the gap between the double-wall regions.

The invention also relates to an electric machine having an inventive short-circuiting ring or an inventive rotor. The electric machine is particularly preferably used here in vehicles, in particular as an electric drive of a vehicle.

Furthermore, the present invention relates to a method for manufacturing a short-circuiting ring. The method comprises the steps of making available a strip-shaped, single-piece strip material and of shaping, in particular bending, the strip material to form a serpentine, single-piece annular body. The strip material is preferably shaped here in such a way that the annular body is formed with a non-closed abutting edge. The shaping steps are preferably also implemented in such a way that meanders are alternately formed on an inner circumference and an outer circumference of the annular body. The meanders also preferably have a different radius on the inner circumference than the meanders on the outer circumference, preferably a larger radius on the inner circumference.

Aluminum or copper or a copper-containing material, e.g. a copper beryllium alloy is preferably used as the material for the short-circuiting ring.

BRIEF DESCRIPTION OF THE DRAWINGS

Preferred exemplary embodiments of the invention are described in detail below with reference to the accompanying drawing. In the drawing, identical or functionally identical parts are denoted here with the same reference symbols. In the drawing.

DETAILED DESCRIPTION

Figure 1:
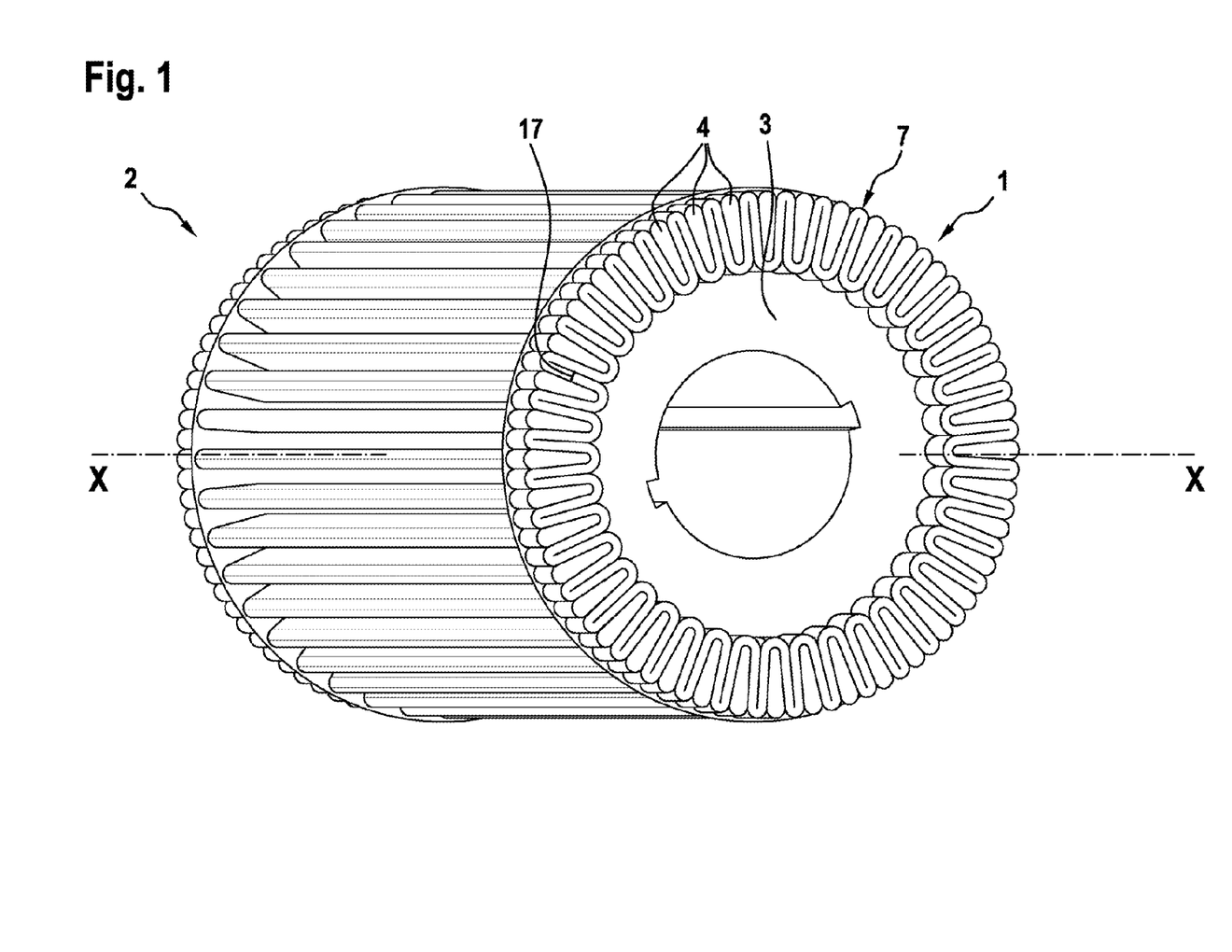
FIG. 1 shows a schematic perspective view of a rotor according to a first exemplary embodiment.

A short-circuiting ring 1 for a rotor 2 of an electric machine is described in detail below with reference to FIGS. 1 to 3.

The rotor 2 comprises a laminated core composed of a multiplicity of laminations 3 which are connected to one another in axial direction X-X by means of a multiplicity of short-circuiting rods 4. As is apparent from FIG. 2, the short-circuiting rods 4 have a tapering, droplet-shaped cross-sectional form. The short-circuiting rods 4 protrude somewhat from the last lamination 3 of the rotor here.

Figure 2:
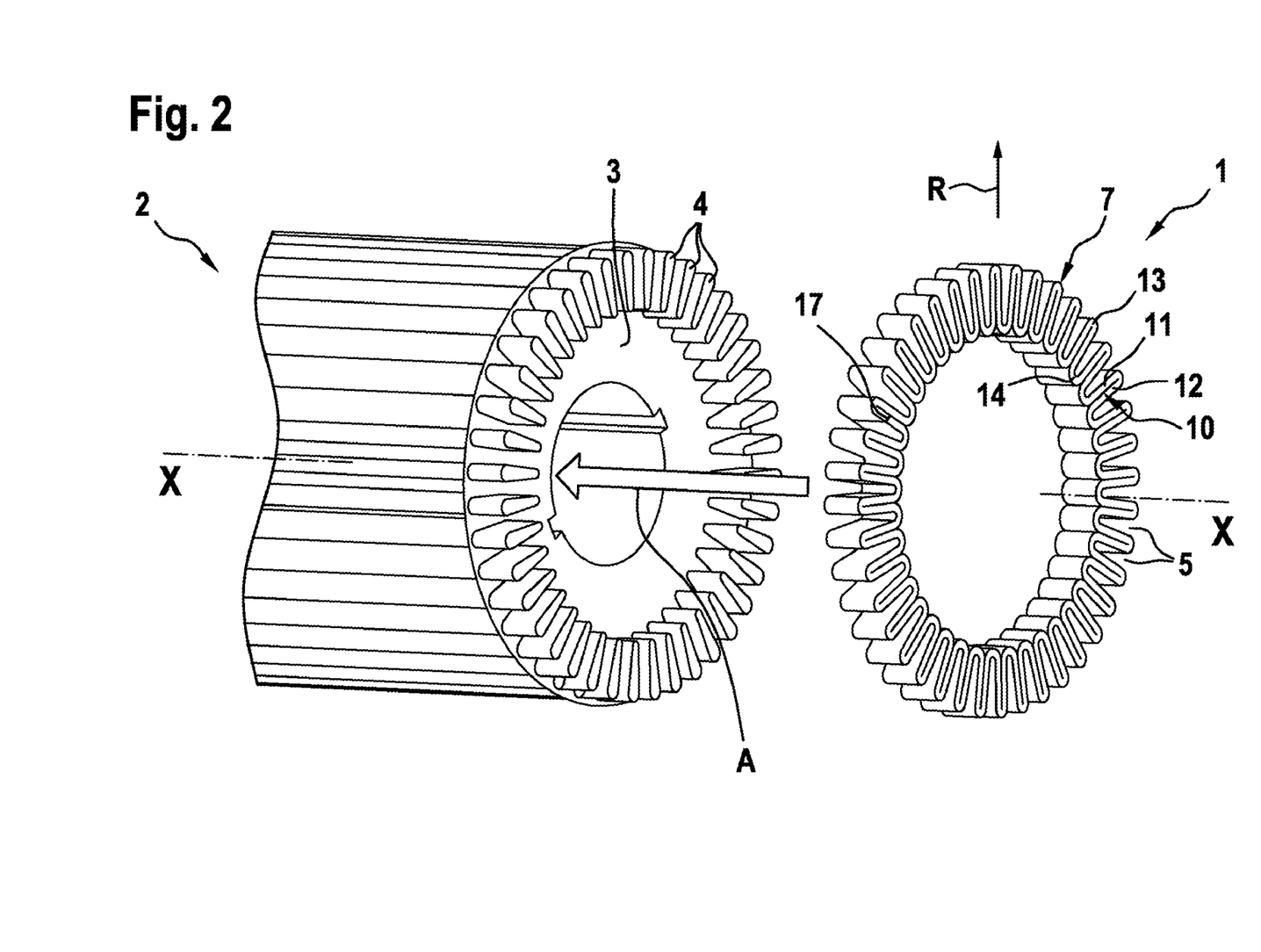
FIG. 2 shows a schematic illustration of a mounting step of the rotor from FIG. 1.
Figure 3:
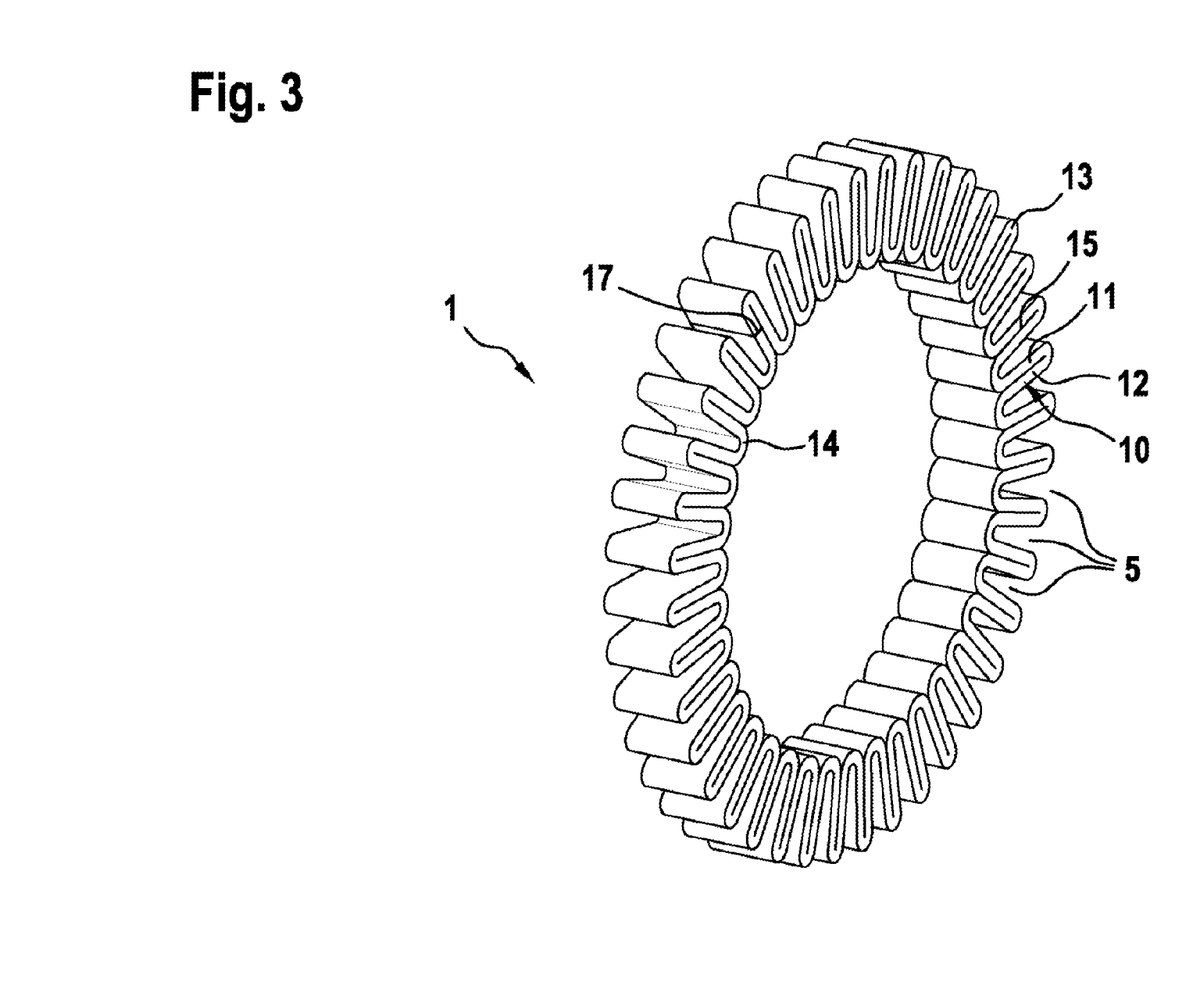
FIG. 3 shows a schematic illustration of the short-circuiting ring from FIG. 1.

FIGS. 2 and 3 show in detail the inventive short-circuiting ring 1. The short-circuiting ring 1 is fabricated in one piece from a strip material. The short-circuiting ring 1 comprises a serpentine annular body 7. The strip material is bent over in a serpentine shape in the circumferential direction, with the result that a multiplicity of meanders which run to and fro is formed.

The annular body 7 of the short-circuiting ring 1 comprises double-wall regions 10 here with a first wall 11 and a second wall 12. The two walls 11 and 12 of a double-wall region are each connected here with a small radius by means of an arcuate, outer connecting region 13. Double-wall regions which adjoin one another are connected by means of an arcuate inner connecting region 14 which forms a meander. The meanders are directed in the radial direction R. The meanders are provided here alternately on the inner and outer circumference of the annular body. All the meanders with a large radius are provided on the inner circumference of the annular body, and all the meanders with a small radius are provided on the outer circumference of the annular body.

As is apparent from FIGS. 2 and 3, the double-wall regions 10 run in a radial direction R of the short-circuiting ring 1. The serpentine short-circuiting ring 1 is formed here in such a way that receptacle sections 5 for receiving the end regions of the short-circuiting rods 4 are provided between the double-wall regions 10 in each case.

The receptacle sections 5 are formed to taper here conically, in accordance with the conically tapering cross section of the short-circuiting rods 4.

In contrast to the short-circuiting rings manufactured hitherto from a solid material in the prior art, the short-circuiting ring according to the invention has the advantage that it can be manufactured from a single-piece strip material exclusively by bending. The serpentine shape of the short-circuiting ring can also prevent it from becoming detached from the rotor owing, for example, to high centrifugal forces.

FIG. 2 shows the process of mounting the short-circuiting ring 1 according to the invention on the rotor 2. The latter merely has to be mounted in the axial X-X direction of the rotor, as indicated by the arrow A, over the end regions of the short-circuiting rods 4. Since the receptacle sections 5 and the cross sections of the short-circuiting rods 4 have the same geometric shape, this can be done easily, with the result that a positively locking connection is provided (cf. FIG. 1).

The short-circuiting ring is bent here from a rectangular strip of strip material, wherein a start 18 of the strip material and an end 19 of the strip material form a junction 17 in a wall of the double-wall regions 10.

If the positive engagement between the short-circuiting ring 1 and the end regions of the short-circuiting rods 4 is not considered to provide sufficient securement, the short-circuiting ring 1 can additionally also be attached to the short-circuiting rods 4 by means of soldering or welding, in particular laser welding. In this context, solder material or welding material is also particularly preferably inserted into a gap 15 which is respectively present between the walls 11, 12 of the double-wall regions 10. As a result, particularly fixed securement of the short-circuiting ring on the rotor 2 is achieved while at the same time electrical contact is formed.

Since the short-circuiting ring 1 is a single-piece component, no parts can become detached. As a result, the single-piece short-circuiting ring according to the invention provides a multiplicity of advantages over the short-circuiting ring which is already proposed in the prior art and is composed of a multiplicity of individual parts. Furthermore, as a result of the geometry of the serpentine annular body of the short-circuiting ring 1 and the cross section of the short-circuiting rods 4 the short-circuiting ring 1 is also held in a self-reinforcing fashion.

The gap 15 is open in the radially inwardly directed direction. The serpentine annular body 7 is made available by a multiplicity of meanders which are bent running to and fro in the radial direction of the annular body along the circumferential direction.

Since the short-circuiting ring according to the invention can be manufactured from a simple, single-piece strip material, different short-circuiting rings with different widths (dimensions of the short-circuiting rings in the axial direction X-X of the rotor) can also be made available for different manufacturers of electric machines.

Figure 4:
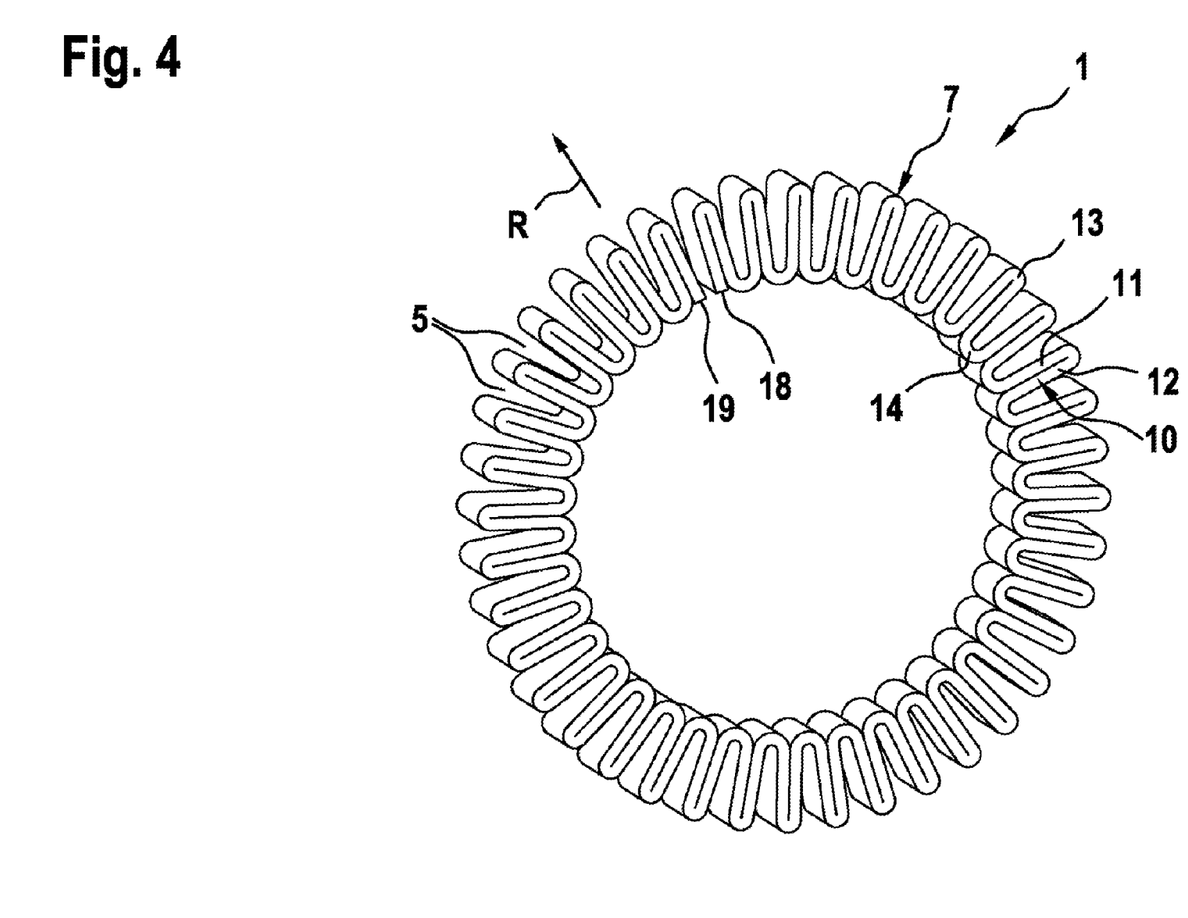
FIG. 4 shows a schematic illustration of a short-circuiting ring according to a second exemplary embodiment of the invention.

FIG. 4 shows a short-circuiting ring 1 according to a second exemplary embodiment of the invention. In contrast to the first exemplary embodiment, the short-circuiting ring of the second exemplary embodiment does not have a joint 17. A start 18 and an end 19 of the strip material are each provided on a double-wall 10 region, wherein the start 18 and the end 19 of the strip material each form a termination forming in the radially inwardly directed direction. Otherwise, the short-circuiting ring 1 of the second exemplary embodiment corresponds to that of the first exemplary embodiment, with the result that reference can be made to this description.

Figure 5:
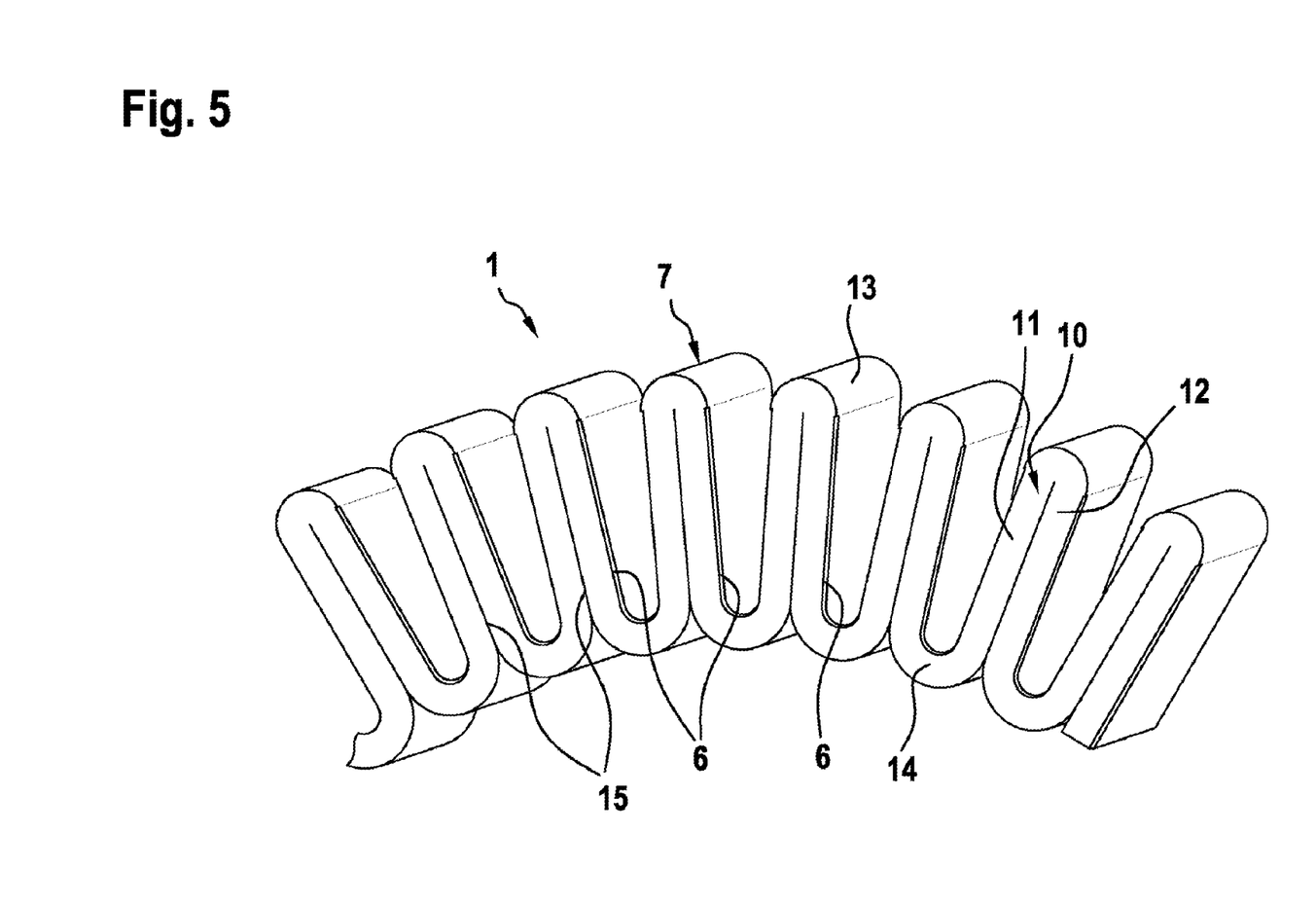
FIG. 5 shows a schematic partial view of a short-circuiting ring according to a third exemplary embodiment of the invention.

FIG. 5 shows a part of a short-circuiting ring 1 according to a third exemplary embodiment of the invention. The short-circuiting ring 1 of the third exemplary embodiment additionally also has a chamfer 6 on edge regions of the strip material, preferably on one side. As is apparent from FIG. 1, the chamfer 6 is formed on the edges of the walls 11, 12 of the double-wall regions 10 and on the inner connecting region 14. As a result, in particular mounting of the short-circuiting ring on the end regions of the short-circuiting rods 4 is made easier. Otherwise, this exemplary embodiment corresponds to the previous exemplary embodiments, with the result that reference can be made to the description provided there.

Figure 6:
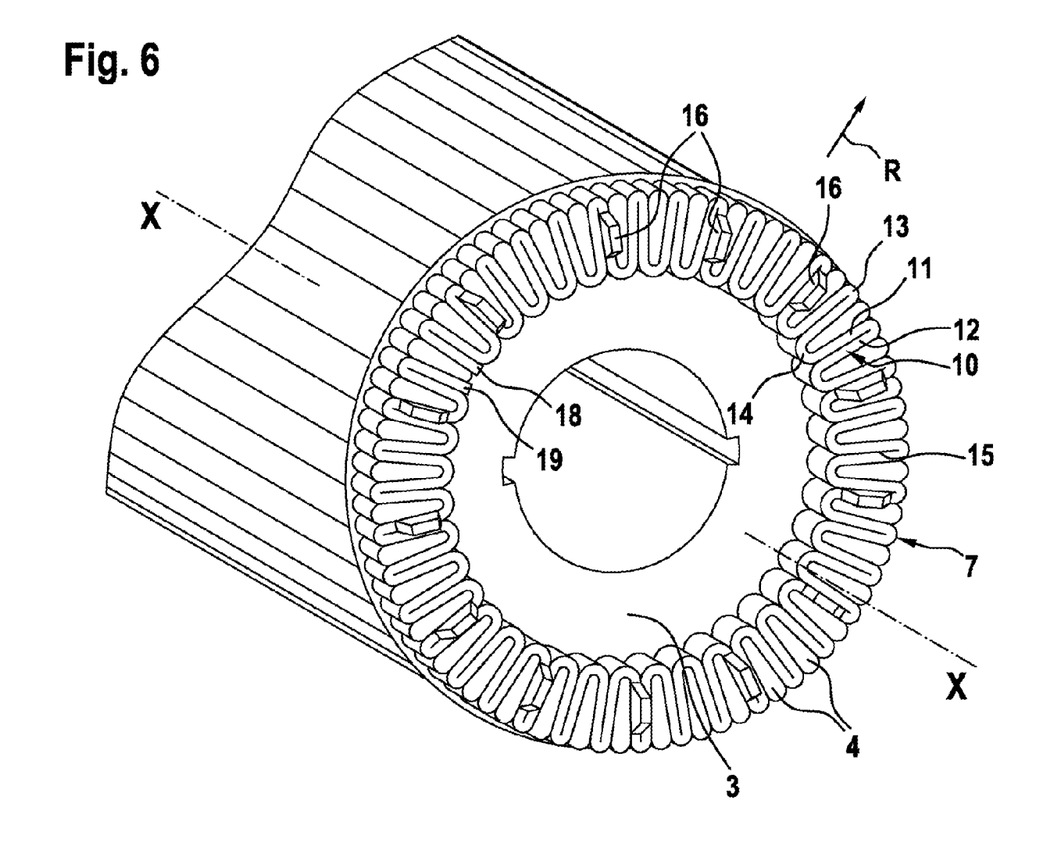
FIGS. 6 and 7 show schematic illustrations of a short-circuiting ring and of a rotor according to a fourth exemplary embodiment of the invention.
Figure 7:
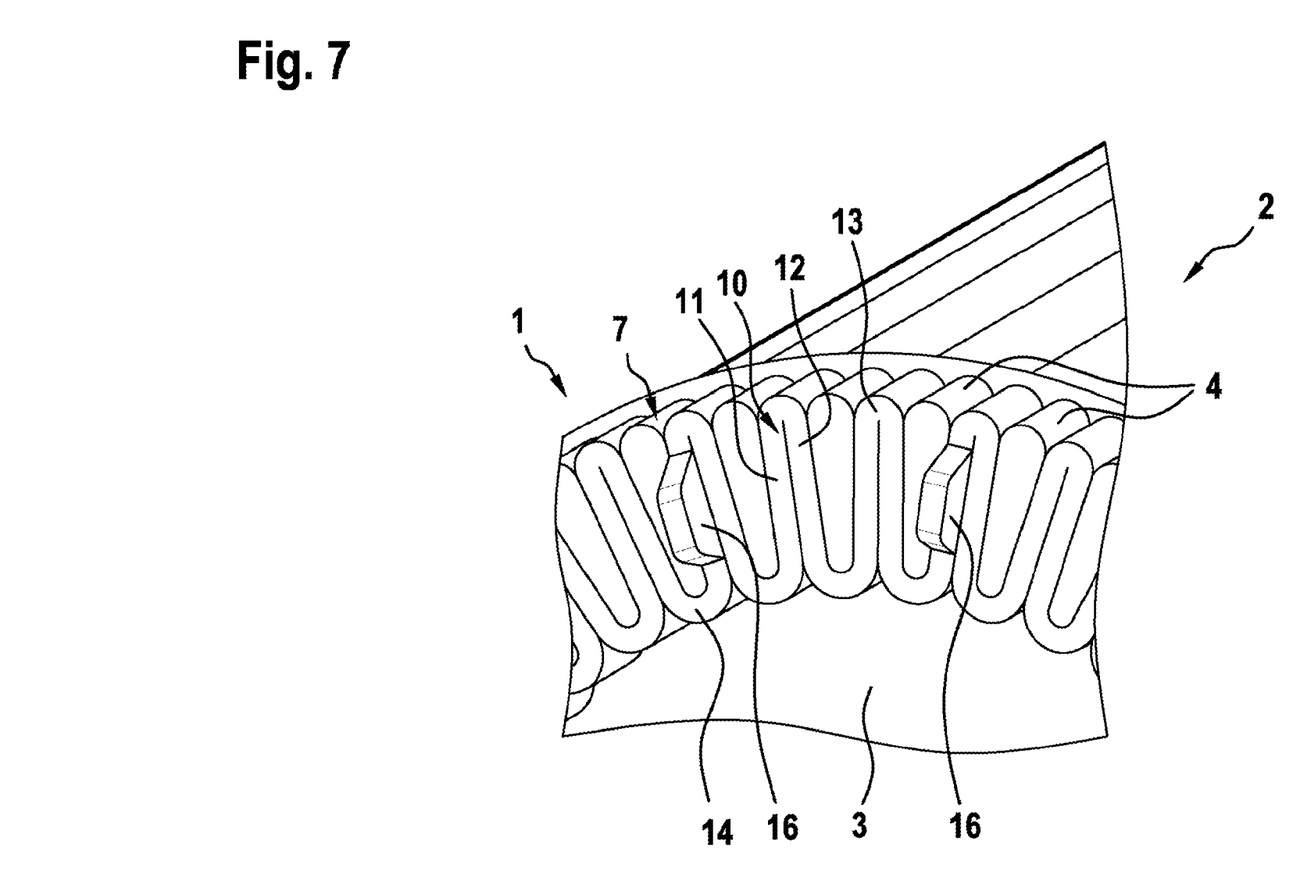

FIGS. 6 and 7 show a short-circuiting ring 1 according to a fourth exemplary embodiment of the invention. The short-circuiting ring 1 of the fourth exemplary embodiment corresponds essentially to that of the first exemplary embodiment, wherein air-circulation vanes 16 are additionally also provided. The air-circulation vanes 16 are arranged here in such a way that they protrude from the annular body 7 of the short-circuiting ring 1 in the axial direction X-X. The air-circulation vanes 16 are already made available here in the single-piece strip material, e.g. by stamping, and are then positioned in the correspondingly desired position in the finished short-circuiting ring by means of the bending process. In this exemplary embodiment, a multiplicity of air-circulation vanes 16 are provided here. The use of the air-circulation vanes 16 permits, in particular, cooling of the electric machine to be improved.

Figure 8:
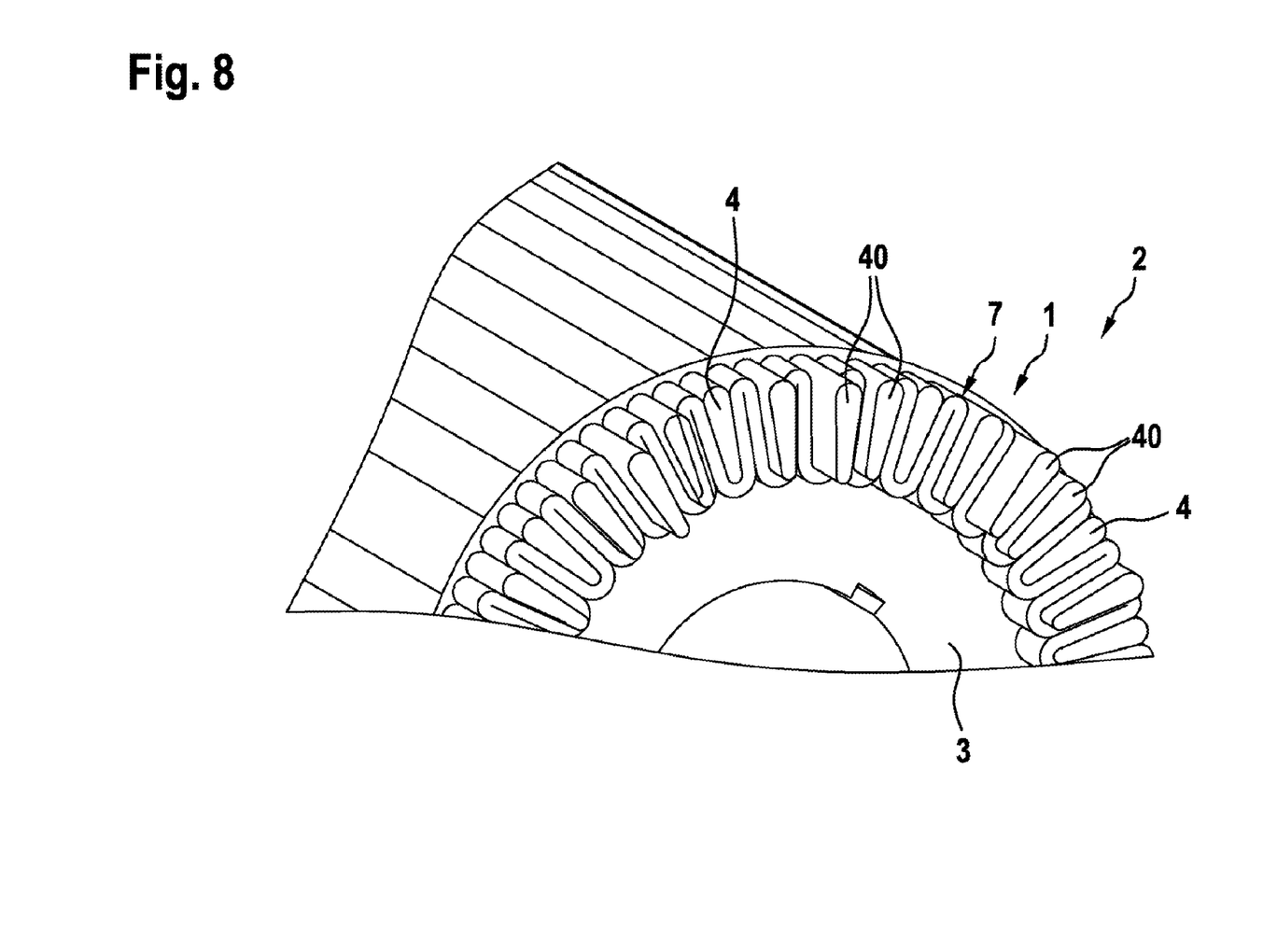
FIG. 8 shows a schematic illustration of a rotor and of a short-circuiting ring according to a fifth exemplary embodiment of the invention.

FIG. 8 shows a short-circuiting ring 1 according to a fifth exemplary embodiment of the invention. In this exemplary embodiment, additional air circulation is brought about by means of end regions 40, extended in the axial direction X-X, of the short-circuiting rods 4. As is apparent from FIG. 8, the short-circuiting rods 4 protrude somewhat beyond the short-circuiting ring 1. As a result, in the case of rotation increased convection and therefore improved conducting away of heat can be achieved. In this context it is possible for the short-circuiting rods 4 to be provided in such a way that adjacent short-circuiting rods have different protruding lengths. It should be noted that it is also possible for the length of the protruding region of the end regions of the short-circuiting rods 4 to be the same over the short-circuiting ring.

Figure 9:
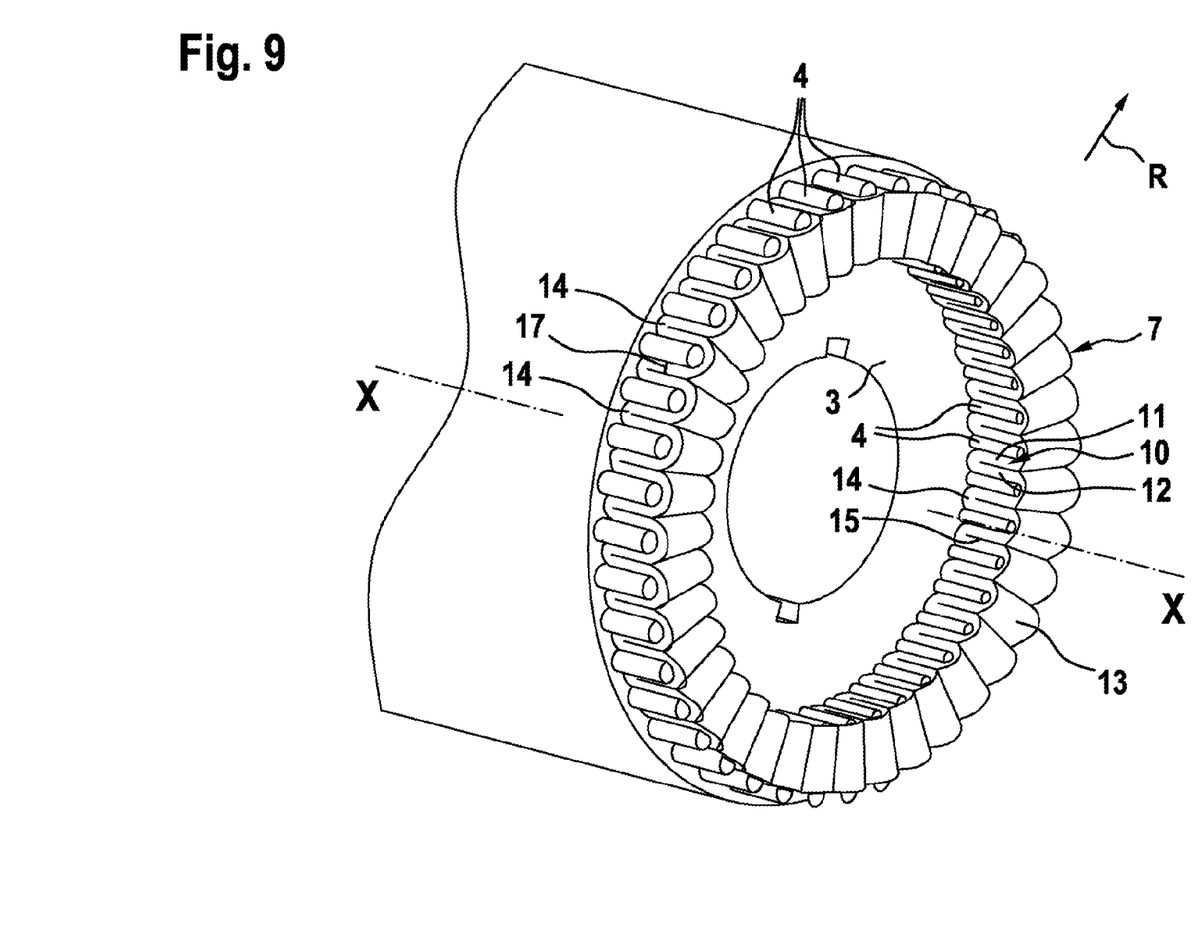
FIG. 9 shows a schematic illustration of a short-circuiting ring and rotor according to a sixth exemplary embodiment of the invention.

FIG. 9 shows a short-circuiting ring 1 according to a sixth exemplary embodiment of the invention. Although, in contrast to the preceding exemplary embodiments, the short-circuiting ring 1 is also embodied in a serpentine form in the circumferential direction, the loops of the meanders are formed in the axial direction X-X. As in the first exemplary embodiment, double-wall regions 10 are formed again and are arranged between adjacent short-circuiting rods 4. The outer connecting regions 13 form here the axial termination of the rotor 2 (cf. FIG. 9). The outer connecting regions 13 have here a larger radius than the inner connecting regions 14. The short-circuiting ring 1 of this exemplary embodiment is plugged onto the end side of the rotor 2 in the axial direction X-X here and can additionally be soldered or welded.

The invention claimed is:

1. A short-circuiting ring for an electric machine, the short-circuiting ring comprising a serpentine, single-piece annular body (7) which is fabricated from a single-piece strip material, wherein the annular body includes a plurality of double-wall regions, each double-wall region including a first wall having a first wall thickness in a circumferential direction and a second wall having a second wall thickness in a circumferential direction, wherein the annular body has receptacle sections for receiving end regions of circumferentially spaced short-circuiting rods between adjacent double-wall regions, and wherein the first wall thickness and the second wall thickness are each approximately half of the circumferential distance between adjacent short-circuiting rods.

2. The short-circuiting ring as claimed in claim 1, characterized in that the serpentine annular body (7) has a multiplicity of meanders which are directed in the radial direction (R) of the annular body.

3. The short-circuiting ring as claimed in claim 1, characterized in that the double-wall regions (10) of the annular body run in the radial direction (R) of the annular body.

4. The short-circuiting ring as claimed in claim 1, characterized in that the first wall (11) and the second wall (12) are connected in a radially outwardly directed direction of the annular body (7) by means of an arcuate, outer connecting region (13) and/or form a meander.

5. The short-circuiting ring as claimed in claim 1, characterized in that between the first wall (11) and the second wall (12) there is a gap (15) which is open in the radially inwardly directed direction of the annular body (7).

6. The short-circuiting ring as claimed in claim 1, also comprising arcuate inner connecting regions (14) which connect adjacent double-wall regions (10) to one another.

7. The short-circuiting ring as claimed in claim 1, characterized in that the serpentine annular body (7) has a multiplicity of meanders which are directed in the axial direction (X-X) of the annular body.

8. The short-circuiting ring as claimed in claim 7, characterized in that the double-wall regions (10) of the annular body run in an axial direction (X-X).

9. The short-circuiting ring as claimed in claim 1, also comprising air circulation vanes (16) which protrude from the annular body (7).

10. The short-circuiting ring as claimed in claim 9, characterized in that the air-circulation vanes (16) are arranged on at least one of the walls of the double-wall regions (10).

11. The short-circuiting ring as claimed in claim 1, characterized in that the serpentine annular body (7) has at least partially a chamfer (6) on edge regions.

12. The short-circuiting ring as claimed in claim 1, characterized in that the receptacle sections (5) are embodied in a tapering fashion.

13. A rotor for an electric machine, comprising a short-circuiting ring (1) as claimed in claim 1.

14. The rotor as claimed in claim 13, characterized in that at least one of the short-circuiting rods (4) protrudes beyond the short-circuiting ring (1) in the axial direction (X-X) in order to bring about air circulation.

15. The rotor as claimed in claim 13, characterized in that the short-circuiting rods (4) have a tapering cross section.

16. The rotor as claimed in claim 13, characterized by a positively locking and/or frictionally locking connection or a soldered connection or a welded connection between the short-circuiting rods (4) and the short-circuiting ring (1).

17. The short-circuiting ring as claimed in claim 1, also comprising air circulation vanes (16) which protrude from the annular body (7) in an axial direction (X-X).

18. The short-circuiting ring as claimed in claim 12, characterized in that the receptacle sections (5) are tapering radially inward.

19. The rotor as claimed in claim 13, characterized in that the short-circuiting rods (4) have a droplet-shaped cross section.

20. A method for manufacturing a short-circuiting ring, comprising the steps:
providing a strip-shaped, single-piece strip material, and
shaping the strip material to form a serpentine, single-piece annular body (7) having 1) a plurality of double-wall regions, each double-wall region including a first wall having a first wall thickness in a circumferential direction and a second wall having a second wall thickness in a circumferential direction and 2) receptacle sections for receiving end regions of circumferentially spaced short-circuiting rods between adjacent double-wall regions, wherein the first wall thickness and the second wall thickness are each approximately half of the circumferential distance between adjacent short-circuiting rods.

\* \* \* \* \*